(12) United States Patent
Hayashi et al.

(10) Patent No.: US 7,893,578 B2
(45) Date of Patent: Feb. 22, 2011

(54) ELECTRIC MOTOR WITH DISCRETE CIRCUIT BOARD AND SENSOR CASE

(75) Inventors: Kinya Hayashi, Seto (JP); Tsuyoshi Shiga, Nagoya (JP); Naoto Kikuchi, Seto (JP)

(73) Assignees: Kabushiki Kaisha Toshiba, Tokyo (JP); Toshiba Ha Products Co., Ltd., Osaka-Fu (JP); Toshiba Consumer Marketing Corporation, Tokyo (JP)

( * ) Notice: Subject to any disclaimer, the term of this patent is extended or adjusted under 35 U.S.C. 154(b) by 268 days.

(21) Appl. No.: 11/596,970

(22) PCT Filed: Apr. 13, 2005

(86) PCT No.: PCT/JP2005/007150

§ 371 (c)(1),
(2), (4) Date: Jun. 8, 2007

(87) PCT Pub. No.: WO2005/114816

PCT Pub. Date: Dec. 1, 2005

(65) Prior Publication Data

US 2007/0252454 A1 Nov. 1, 2007

(30) Foreign Application Priority Data

May 20, 2004 (JP) .............................. 2004-150520

(51) Int. Cl.
- H02K 11/00 (2006.01)
- H02K 29/00 (2006.01)
- H02K 29/06 (2006.01)
- H02K 29/08 (2006.01)

(52) U.S. Cl. ...................... 310/68 B; 310/68 R; 310/71; 310/156.05; 310/156.06; 324/174; 324/207.2; 324/207.25

(58) Field of Classification Search .................... 310/68, 310/71, 51, 52, 53, 68 B, 68 R, 156.05, 156.06; 318/830; 324/174, 207.13, 207.17, 207.2, 324/207.25; H02K 11/00, 23/66, 11/04, H02K 19/36, 5/00, 29/00, 29/06, 29/08
See application file for complete search history.

(56) References Cited

U.S. PATENT DOCUMENTS 6,050,785 A 4/2000 Horng (Continued)

FOREIGN PATENT DOCUMENTS

EP 0 547 935 6/1993

(Continued)

OTHER PUBLICATIONS

European Search Report dated Dec. 11, 2008 for Appln. No. PCT/JP2005007150.

*Primary Examiner*—Quyen Leung
*Assistant Examiner*—Michael Andrews
(74) *Attorney, Agent, or Firm*—Pillsbury Winthrop Shaw Pittman, LLP

(57) ABSTRACT

An electric motor includes a rotor having a field permanent magnet, a board housing member fixed to a stator, and a magnetism detecting circuit that detects the magnetism of the field permanent magnet. The magnetism detecting circuit includes a circuit board that is discrete from the board housing member, a sensor case that is discrete from the circuit board and is supported on the circuit board, and a rotation sensor held by the sensor case. The board housing member has an engagement hole and a positioning surface. The sensor case has an engagement convexity corresponding to the engagement hole and an abutting surface corresponding to the positioning surface. When the circuit board has been located in the board housing member, the engagement convexity engages the engagement hole and the abutting surface abuts the positioning surface, resulting in that the rotation sensor is positioned relative to the board housing member.

3 Claims, 5 Drawing Sheets

U.S. PATENT DOCUMENTS

| | | | |
|---|---|---|---|
| 6,472,785 B2 * | 10/2002 | Petit et al. | 310/71 |
| 6,488,475 B2 * | 12/2002 | Murata et al. | 417/32 |
| 2003/0098660 A1 * | 5/2003 | Erdman et al. | 310/68 B |
| 2003/0173920 A1 * | 9/2003 | Tominaga et al. | 318/432 |
| 2004/0007935 A1 * | 1/2004 | Kimura et al. | 310/254 |
| 2004/0090132 A1 * | 5/2004 | Utsumi et al. | 310/68 B |

FOREIGN PATENT DOCUMENTS

| | | |
|---|---|---|
| EP | 0 577 201 | 1/1994 |
| JP | 09-318305 A | 12/1997 |
| JP | 09312948 A * | 12/1997 |
| JP | 2000-41371 A | 2/2000 |
| JP | 2002-252946 A | 9/2002 |
| JP | 09-312948 A | 11/2003 |
| JP | 2004-48908 A | 2/2004 |

* cited by examiner

ELECTRIC MOTOR WITH DISCRETE CIRCUIT BOARD AND SENSOR CASE

TECHNICAL FIELD

The present invention relates to an electric motor provided with a rotation sensor detecting a rotational position of a rotor.

BACKGROUND ART

Electric motors include a type in which motor coils are connected via an insulating terminal block to an external circuit. In this type of motor, a rotational position detecting circuit is provided integrally in the terminal block so that efficiency in assembly of the terminal block to the motor is improved. In this case, Hall elements serving as a rotation sensor and a heat sensitive element serving as a temperature sensor are fitted into element mounting portions after an electrically conductive plate has been formed by insert molding in the forming of the terminal block. A secondary formation is then carried out so that the rotational position detecting circuit is formed integrally. Japanese Patent No. 3497684 discloses an electric motor constructed as described above, for example.

DISCLOSURE OF THE INVENTION

Problem to be Overcome by the Invention

In the above-described method, however, shrinkage of resin after the primary formation sometimes reduces dimensional accuracy of each element mounting portion. Reduction in the dimensional accuracy of each element mounting portion results in reduction in the mounting accuracy of the Hall elements, thereby reducing a detection accuracy of rotational position of the rotor.

An object of the present invention is to provide an electric motor in which accuracy in positioning the rotation sensor relative to the terminal block can be improved in an arrangement that motor coils are connected via the terminal block to an external circuit.

Means for Overcoming the Problem

The embodiments of the invention, as disclosed herein, provide an electric motor that comprises a stator, a rotor having a field permanent magnet, a board housing member fixed to the stator, and a magnetism detecting circuit that detects magnetism of the field permanent magnet, thereby detecting a rotational position of the rotor. The magnetism detecting circuit includes a circuit board that is discrete from the board housing member while being provided on the board housing member, a sensor case that is discrete from the circuit board while being supported by a side surface of the circuit board located at the rotor side, and a rotation sensor held by the sensor case. The board housing member has an engagement hole and a positioning surface, the engagement hole being defined in a side of the board housing member opposed to the rotor. The sensor case has an engagement convexity which corresponds to the engagement hole of the board housing member and an abutting surface which corresponds to the positioning surface of the board housing member. With such a configuration, when the circuit board has been provided on the board housing member, the engagement convexity engages the engagement hole and the abutting surface abuts the positioning surface from a radial outside of the stator, whereby the rotation sensor is positioned relative to the board housing member.

Effect of the Invention

The magnetism detecting circuit can easily be mounted on the terminal block since the magnetism detecting circuit comprises the circuit board. Furthermore, the rotation sensor can be positioned via the sensor case relative to the terminal block easily and accurately only when the circuit board is provided in the terminal block.

BEST MODE FOR CARRYING OUT THE INVENTION

The invention will be described in more detail with reference to the accompanying drawings. FIGS. 1 to 6 illustrate one embodiment in which the invention is applied to a DC brushless motor of the outer rotor type for driving a rotating tub of a washing machine, for example.

Figure 1:
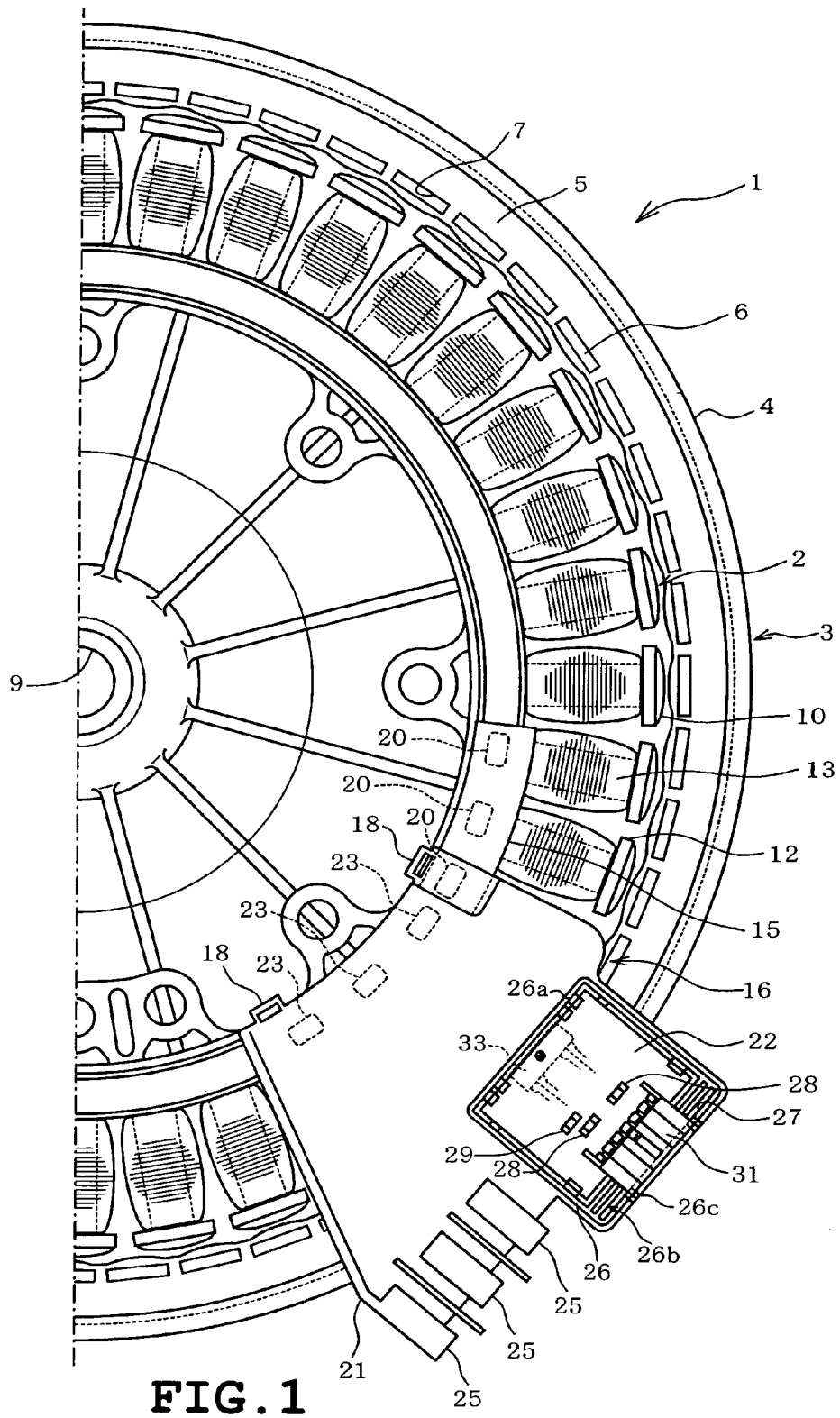
FIG. 1 is a plan view of a part of an electric motor of one embodiment in accordance with the present invention.
Figure 2:
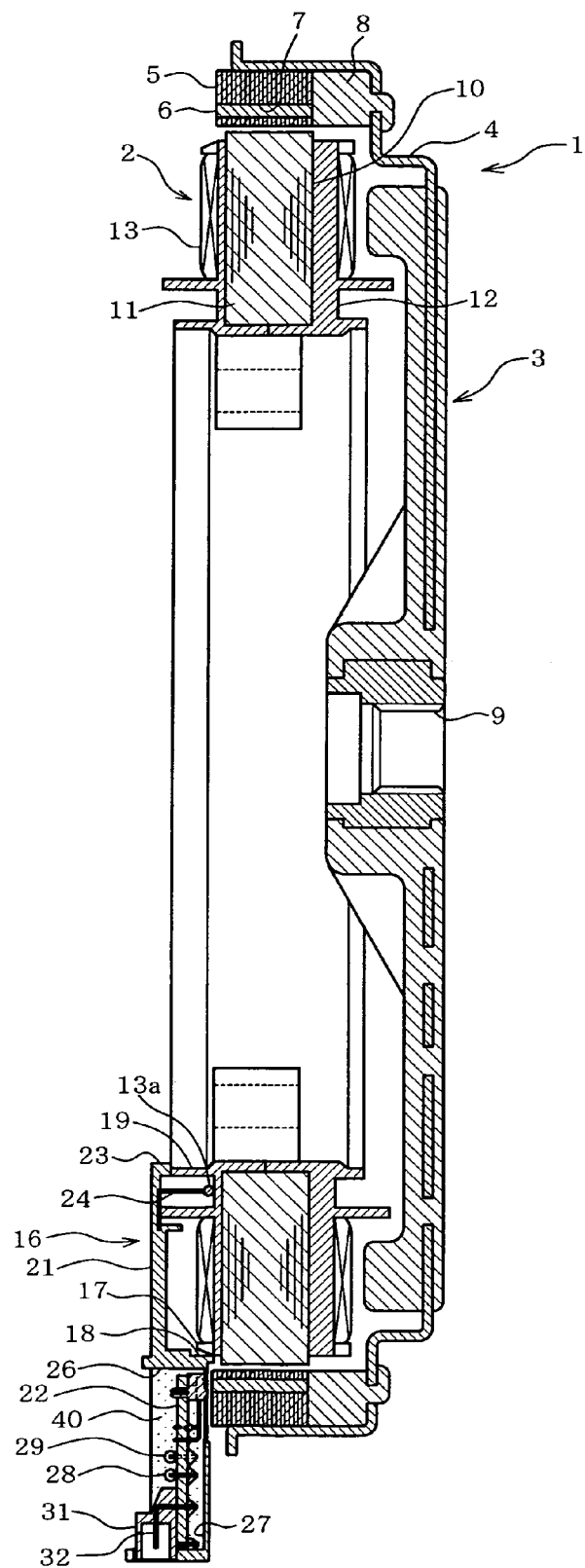
FIG. 2 is a longitudinal sectional side view of the motor.

Referring to FIGS. 1 and 2, the motor 1 of the embodiment comprises a stator 2 and a rotor 3. The rotor 3 includes a frame 4 made from a magnetic material into the shape of a shallow dish, an annular rotor core 5 disposed along an inner circumferential surface of a circumferential wall of the frame 4, and magnetic field permanent magnets 6 disposed on the inner circumference of the rotor core 5. Magnet insertion holes 7 are provided in the inner circumference of the rotor core 5. The magnetic field permanent magnets 6 are inserted in the magnet insertion holes 7 respectively. The rotor core 5, the magnetic field permanent magnets 6 and the frame 4 are integrated by molded resin 8 (shown only in FIG. 2). On a central part of the frame 4 is provided a boss 9 to be coupled to an end of a rotating tub shaft which is not shown.

The stator 2 includes a stator core 11 having a number of radially extending teeth 10, an insulating cover 12 covering the stator core 11 and coils 13 wound on portions of the insulating cover 12 covering the teeth 10. Each coil 13 comprises three coil wires 13a (shown only in FIG. 2).

The stator core 11 is made by stacking a plurality of steel sheets. The insulating cover 12 is made from a non-conductive synthetic resin and comprises a pair of covering members sandwiching the stator core 11 from both axial sides.

A terminal block 15 and a terminal block assembly 16 are attached to an end face (hereinafter, "upper end face") of both axial end faces of the insulating cover 12 unopposed to the frame 4. The terminal block 15 and the terminal block assembly 16 are provided so that ends of the coil wires 13a are easily connected to an external circuit (not shown). A plurality of engagement portions (partially shown in FIG. 2) are provided on the upper end face of the insulating cover 12. Furthermore, the terminal block 15 and the terminal block assembly 16 have engaged portions 18 respectively. The engaged portions 18 are engaged with the engagement portions 17 respectively so that the terminal block 15 and the terminal block assembly 16 are fixed to the insulating cover 12.

Furthermore, six rectangular cylindrical housing portions 19 (only one being shown in FIG. 2) are formed integrally in the portion of the upper end face of the insulating cover 12 to which portion the terminal block 15 and the terminal block assembly 16 are attached. The housing portions 19 are disposed along the inner circumference of the insulating cover 12. One ends (terminal for external connection) of the respective coil wires 13a are inserted into three of the six housing portions 19 located under the terminal block 15.

The terminal block 15 is made from non-conductive synthetic resin. Three housing portions 20 are formed integrally in a lower face of the terminal block 15 (a face opposed to the insulating cover 12). A common connection conductive plate (not shown) is embedded in the terminal block 15. A connecting portion which is an end of the conductive plate protrudes into the housings 20. When the terminal block 15 is attached to the insulating cover 12, the housing 20 is adapted to be fitted with the three housings 19 located higher as viewed in FIG. 1, whereby the connecting portion and common connection terminal are electrically connected to each other.

Figure 3:
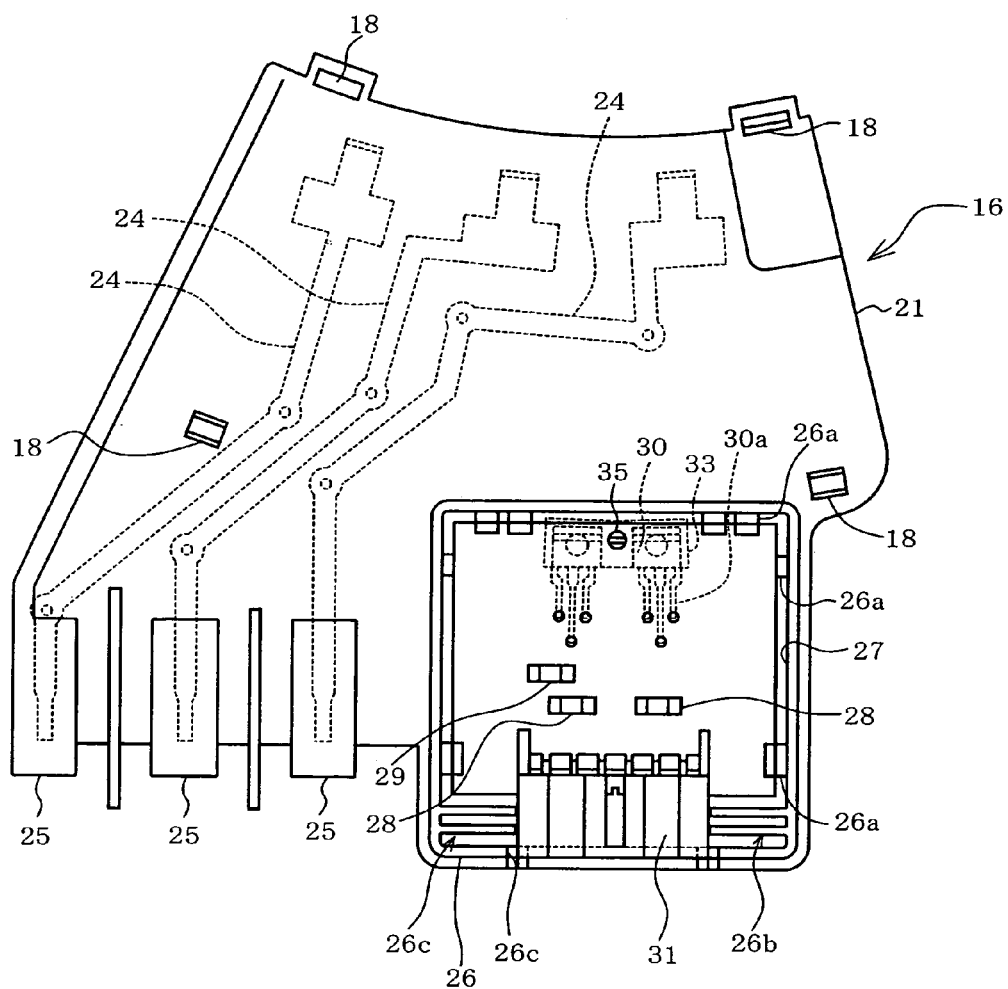
FIG. 3 is a plan view of a terminal block assembly.
Figure 4:
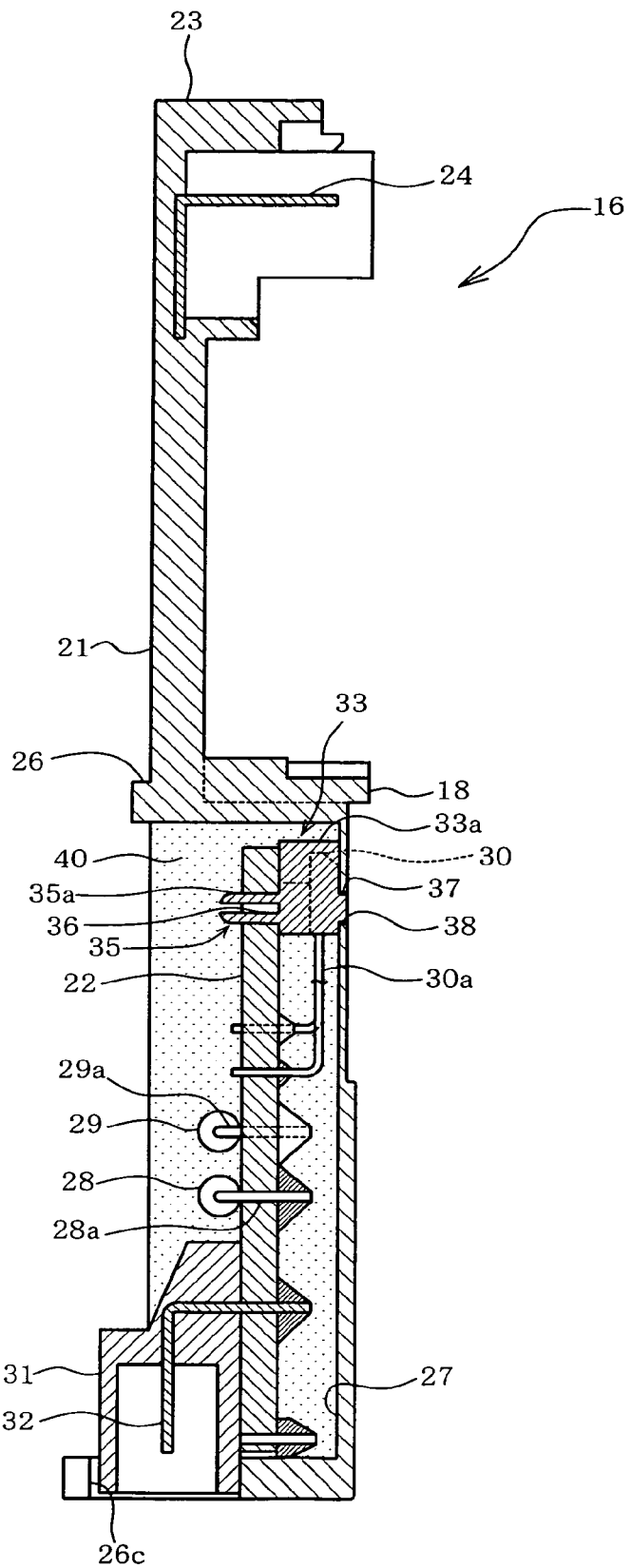
FIG. 4 is a longitudinal sectional side view of the terminal block assembly.

Referring to FIGS. 3 and 4, the terminal block assembly 16 includes a terminal block 21 comprising a non-conductive synthetic resin and a circuit board 22 provided integrally on the terminal block 21. The terminal block 21 includes a portion located on the insulating cover 12 and a portion protruding from the insulating cover 12. Three housing portions 23 are formed integrally in the underside of a portion of the terminal block 21 located on the insulating cover 12 (surface opposed to the insulating cover).

Three conductive plates 24 for external connection are embedded in the terminal block 21. The conductive plates 24 have respective one ends provided with connecting portions (not shown) projecting into the housing portions 23. When the terminal block assembly 16 has been attached to the insulating cover 12, the housing portions 23 are adapted to be fitted with the three housing portions 10 located lower as viewed FIG. 2, whereby the connecting portion and the external connection terminals are electrically connected together.

A rectangular cylindrical connector 25 and a board housing portion 27 are formed integrally on an outer circumferential upper surface of the portion of the terminal block 21 protruding from the insulating cover 12. The board housing portion 27 is defined by a rectangular cylindrical housing wall 26. The conductive plates 24 have the other ends located in the connector 25. Accordingly, when a connector (not shown) of an external circuit is fitted into the connector 25, the three conductive plates 24 are connected to the external circuit.

Furthermore, a rectangular plate-shaped circuit board 22 is housed in the board housing portion 27. The housing wall 26 has an inner circumferential surface provided with a plurality of claws 26a engaging a circumferential edge of the circuit board 22. Some of the claws 26a engage one of sides of the circuit board 22 and the other claws 26a engage the other side of the circuit board 22. The circuit board 22 is fixed in the board housing portion 27.

On the circuit board 22 are provided a magnetism detecting circuit (not shown) comprising a diode 28, a capacitor 29, Hall elements 30 serving as a rotation sensor, and the like. The diode 28 and the capacitor 29 are provided on one side of the circuit board 22 and have respective lead wires 28a and 29a soldered to the circuit board 22.

Furthermore, a connector 31 is provided on an end of one side of the circuit board 22. An external connection conductive plate 32 has one end protruding into the connector 31. The other end of the conductive plate 32 is soldered to the circuit board 22. The housing wall 26 is provided with a multiple wall 26b located at both sides of the connector 31 when the circuit board 22 is placed in the circuit housing 27 and an opening 26c corresponding to an end of the connector 31.

Figure 5:
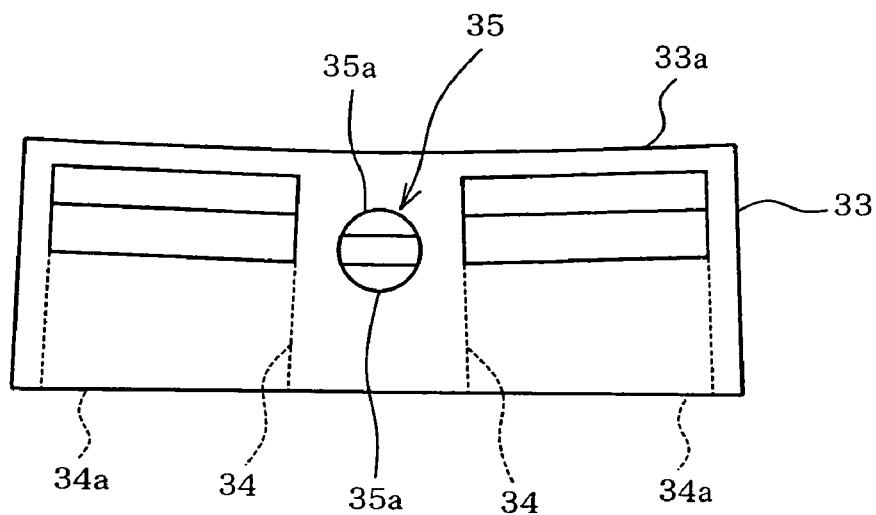
FIG. 5 is a plan view of a sensor case.
Figure 6:
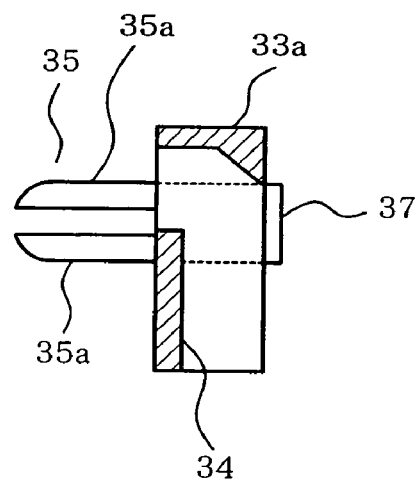
FIG. 6 is a longitudinal sectional side view of the sensor case.

An element case 33 (serving as a sensor case) made from a resin is mounted on an end of the other side of the circuit board 22 for the purpose of holding the Hall elements 30. The element case 33 has two juxtaposed housings 34 in which the Hall elements 30 are adapted to be held therein as shown in FIGS. 5 and 6. The Hall elements 30 are provided for detecting a rotational position of the rotor 3. The Hall elements 30 have lead wires 30a soldered to the circuit board 22.

The element case 33 has a side which is opposed to openings of the housings 34 and formed into a gentle arc face 33a. A fitting protrusion 35 is provided integrally on a central part of the mounting face of the element case 33 which is mounted on circuit board 22. The fitting protrusion 35 is inserted through a hole 36 (see FIG. 4) provided in the circuit board 22 and comprises a pair of half-columns 35a which are disposed so as to become generally columnar. The hole 36 has an inner diameter slightly smaller than an outer diameter of the whole fitting protrusion 35. Accordingly, the protrusion 35 elastically deforms in such a direction that the half-columns 35a comes close thereto when inserted through the hole 36. The protrusion 35 inserted through the hole 36 is thus prevented from falling out of the hole 36.

Furthermore, an engagement convexity 37 is provided on a central part of a side of the element case 33 opposed to the mounting face of the element case 33 which is mounted on circuit board 22. The board housing 27 of the terminal block 22 has a bottom provided with a hole 38 corresponding to the engagement convexity 37. The engagement convexity 37 is adapted to engage the hole 38 when the circuit board 22 is placed in the board housing 27.

Potting of urethane 40 serving as a moisture-proof material is applied in the board housing 27 to prevent the circuit board 22 from being exposed.

An assembling procedure of the terminal block assembly 16 will now be described. Firstly, the element case 33 is mounted to the circuit board 22 on which the diode 28, the capacitor 29 and the like have been mounted. More specifically, the fitting protrusion 35 of the element case 33 is fitted into the hole 36 of the circuit board 22. The Hall elements 30 are then inserted into the respective housings 34 of the element case 33. The Hall elements 30 having been inserted in the respective housings 34 are held by engaging means (not shown) so as to be prevented from falling out of the housings 34.

Subsequently, the circuit board 22 is placed in the board housing 27 of the terminal block 21 with the board side with the element case 33 being placed down so that the engagement convexity 3 engages the hole 38 of the board housing 27. In this case, the element case 33 is elastically deformed slightly such that the arc surface 33a comes to a planar shape and many parts of the arc surface 33a strongly abut against the housing wall 26. FIG. 3 shows the arc surface 33a before elastic deformation. However, as shown in FIG. 4, even after the elastic deformation, a small gap is adapted to be defined between the arc surface 33a and the housing wall 26. More specifically, in the embodiment, the arc surface 33a serves as an abutting surface, and the housing wall 26 serves as a positioning wall. Furthermore, the positioning portion in the present invention is composed of the arc surface 33a and the housing wall 26. As a result, the element case 33 is fixed to the terminal block 21, and the Hall elements 30 held by the element case 33 are positioned relative to the terminal block 21.

Subsequently, the board housing 27 is filled with urethane 40, which is then hardened. Thus, the terminal block assembly 16 is constructed. The urethane 40 has low viscosity although relatively less expensive. Since the multiple wall 26b is provided in the embodiment, the urethane 40 can be prevented from leaking from the opening 26c.

According to the embodiment, the board housing 27 is provided in the terminal block, and the circuit board 22 having the magnetism detecting circuit is provided in the board housing 27. Accordingly, the magnetism detecting circuit can be provided in the terminal block 21 more easily as compared with the conventional arrangement in which the conductive plate constituting the magnetism detecting circuit is embedded in the terminal block.

Furthermore, the Hall elements 30 are held in the element case 33 mounted on the circuit board 22. The circuit board 22 is then placed in the board housing 27, whereby the Hall elements 30 are positioned relative to the terminal block 21. Moreover, the engagement convexity 37 provided on the element case 33 is caused to engage the hole 38, and the arc surface 33a is caused to abut against the housing wall 26 so that the element case 33 is prevented from rattling, whereby the Hall elements 33 are positioned. Consequently, the Hall elements 30 can be positioned relative to the terminal block 21 easily and accurately.

Furthermore, the element case 33 is provided with the fitting protrusion 35 which is fitted into the hole 36 so that the element case 33 is fixed to the circuit board 22. Consequently, the working efficiency can be improved when the element case 33 is mounted on the circuit board 22.

The present invention should not be limited to the foregoing embodiment but may be modified or expanded within a range not departing from the gist.

INDUSTRIAL APPLICABILITY

As obvious from the foregoing, the motor of the present invention is useful as a motor for driving a rotating tub in a washing machine, for example, since the rotational position of the rotor can be controlled accurately.

The invention claimed is:

1. An electric motor comprising:
   a stator;
   a rotor having a field permanent magnet;
   a board housing member fixed to the stator; and
   a magnetism detecting circuit detecting magnetism of the field permanent magnet, thereby detecting a rotational position of the rotor wherein:
   the magnetism detecting circuit includes a circuit board that is discrete from the board housing member while being provided on the board housing member, a sensor case that is discrete from the circuit board while being supported by a side surface of the circuit board located at the rotor side, and a rotation sensor held by the sensor case;
   the board housing member has an engagement hole and a positioning surface, the engagement hole being defined in a side of the board housing member opposed to the rotor;
   the sensor case has an engagement convexity which corresponds to the engagement hole of the board housing member and an abutting surface which corresponds to the positioning surface of the board housing member; and
   when the circuit board has been provided on the board housing member, the engagement convexity engages the engagement hole and the abutting surface abuts the positioning surface from a radial outside of the stator, whereby the rotation sensor is positioned relative to the board housing member.

2. The motor of claim 1, further comprising a hole defined in the circuit board and a fitting protrusion provided on the sensor case, wherein the sensor case is constructed so as to be fixed to the circuit board when the fitting protrusion is fitted in the hole.

3. The motor of claim 1, wherein the positioning surface of the board housing member is formed into a wall shape defining a location where the circuit board is to be disposed as a board housing portion, and the board housing member is filled with a moisture-proof material after the circuit board has been housed therein.

* * * * *